United States Patent
Lian et al.

(10) Patent No.: US 7,633,065 B2
(45) Date of Patent: Dec. 15, 2009

(54) CONDUCTION STRUCTURE FOR INFRARED MICROBOLOMETER SENSORS

(75) Inventors: Ming-Ren Lian, Boca Raton, FL (US); Kevin R. Coffey, Oviedo, FL (US)

(73) Assignees: Sensormatic Electronics, LLC, Boca Raton, FL (US); University of Central Florida Research Foundation, Inc., Orlando, FL (US)

( * ) Notice: Subject to any disclaimer, the term of this patent is extended or adjusted under 35 U.S.C. 154(b) by 123 days.

(21) Appl. No.: 11/583,210

(22) Filed: Oct. 19, 2006

(65) Prior Publication Data

US 2008/0093553 A1    Apr. 24, 2008

(51) Int. Cl.
*G01J 5/24* (2006.01)
(52) U.S. Cl. .................................. 250/338.3
(58) Field of Classification Search ............... 250/338.3
See application file for complete search history.

(56) References Cited

U.S. PATENT DOCUMENTS

| | | | | |
|---|---|---|---|---|
| 5,021,663 A | * | 6/1991 | Hornbeck | 250/349 |
| 5,912,464 A | | 6/1999 | Vilain et al. | |
| 5,945,673 A | * | 8/1999 | Beratan et al. | 250/338.3 |
| 6,087,661 A | * | 7/2000 | Owen et al. | 250/332 |
| 6,201,243 B1 | * | 3/2001 | Jerominek | 250/338.1 |
| 6,437,331 B1 | * | 8/2002 | Kawano | 250/338.3 |
| 2001/0003356 A1 | * | 6/2001 | Yon et al. | 250/338.1 |
| 2005/0082481 A1 | * | 4/2005 | Vilain | 250/338.1 |

FOREIGN PATENT DOCUMENTS

| | | |
|---|---|---|
| WO | WO-91/16607 A1 | 10/1991 |
| WO | WO 9116607 A1 * | 10/1991 |
| WO | WO-02/088648 A1 | 11/2002 |
| WO | WO 02088648 A1 * | 11/2002 |

OTHER PUBLICATIONS

"A surface micromachined amorphous GexSi1-xOy bolometer for thermal imaging applications"; A. H. Z. Ahmed, R. N. Tait, Tania B. Oogarah, H. C. Liu, Mike W. Denhoff, G. I. Sproule, and M. J. Graham ; Proc. SPIE 5578, 298 (2004).*
International Search Report; F-TP-00108 WO; International App. No. PCT/US2007/022206; Mailed Nov. 6, 2008; EPO; Date of Search Oct. 30, 2008 (14 pgs.).

* cited by examiner

*Primary Examiner*—David P Porta
*Assistant Examiner*—Jessica L Eley
(74) *Attorney, Agent, or Firm*—Dean D. Small; The Small Patent Law Group

(57) ABSTRACT

A conduction structure for infrared microbolometer sensors and a method for sensing electromagnetic radiation may be provided. The microbolometer may include a first conductor layer and a second conductor layer. The microbolometer further may include a bolometer layer between the first conductor layer and the second conductor layer.

23 Claims, 2 Drawing Sheets

CONDUCTION STRUCTURE FOR INFRARED MICROBOLOMETER SENSORS

BACKGROUND OF THE INVENTION

1. Field of the Invention

This invention relates generally to monitoring devices including sensors and detectors, and more particularly, to infrared sensors or imagers.

2. Description of the Related Art

Monitoring devices are used in many different applications. For example, detectors and sensors forming part of a monitoring system may be used for intrusion security and video surveillance. Other applications include, for example, fire detection and emergency response. The applications may be, for example, military, non-military, personal, etc. Different types of devices may be provided based on, for example, the particular application or system in which the device is to be used. For example, infrared (IR) imagers configured as thermal cameras may be used within these systems to detect temperature changes.

Different types of IR imagers are known and generally include a bolometer or microbolometer device to detect incident electromagnetic radiation. These bolometers are essentially resistive thermometers that need to maintain a certain total resistance for optimum signal and noise properties. Accordingly, a material with a large value of thermal coefficient of resistivity (TCR) is preferred to produce better IR sensing performance.

With respect to IR imagers, both cooled and uncooled systems are known. For example, IR imagers with bolometers may include cooling systems, such as cryogenic cooling systems, and are known for use typically in military applications. These devices are often complex and larger in size. Further, the cost of these cooled imagers is high. Uncooled systems with microbolometers are less expensive and smaller in design. However, these uncooled systems must typically include a lower resistivity bolometer film material because of the in-plane conduction mode design of these bolometers. The lower resistivity materials often have lower values of TCR when compared to similar, but higher resistivity materials. Increasing the thickness of the bolometer film to improve electrical conduction increases the thermal inertia/capacity of the sensing portion of the device, thereby reducing the overall performance of the imager. The quality, for example, imaging quality, of the cheaper uncooled systems is typically less than the quality of the more expensive cooled systems.

BRIEF DESCRIPTION OF THE INVENTION

A microbolometer may be provided that may include a first conductor layer and a second conductor layer. The microbolometer further may include a bolometer layer between the first conductor layer and the second conductor layer. A thermal camera also may be provided using the microbolometer.

A method for detecting electromagnetic radiation may be provided. The method may include receiving at a thermally sensitive film electromagnetic radiation. The method further may include sensing a resistance change in a bolometer material based on the received electromagnetic radiation using a substantially perpendicular electrical conduction mode.

BRIEF DESCRIPTION OF THE DRAWINGS

For a better understanding of various embodiments of the invention, reference should be made to the following detailed description that should be read in conjunction with the following figures wherein like numerals represent like parts.

DETAILED DESCRIPTION OF THE INVENTION

For simplicity and ease of explanation, the invention will be described herein in connection with various embodiments thereof. Those skilled in the art will recognize, however, that the features and advantages of the various embodiments may be implemented in a variety of configurations. It is to be understood, therefore, that the embodiments described herein are presented by way of illustration, not of limitation.

In general, various embodiments of the invention provide an infrared (IR) microbolometer device having a perpendicular conduction structure. The various embodiments may be used, for example, as a detector in thermal cameras.

Figure 1:
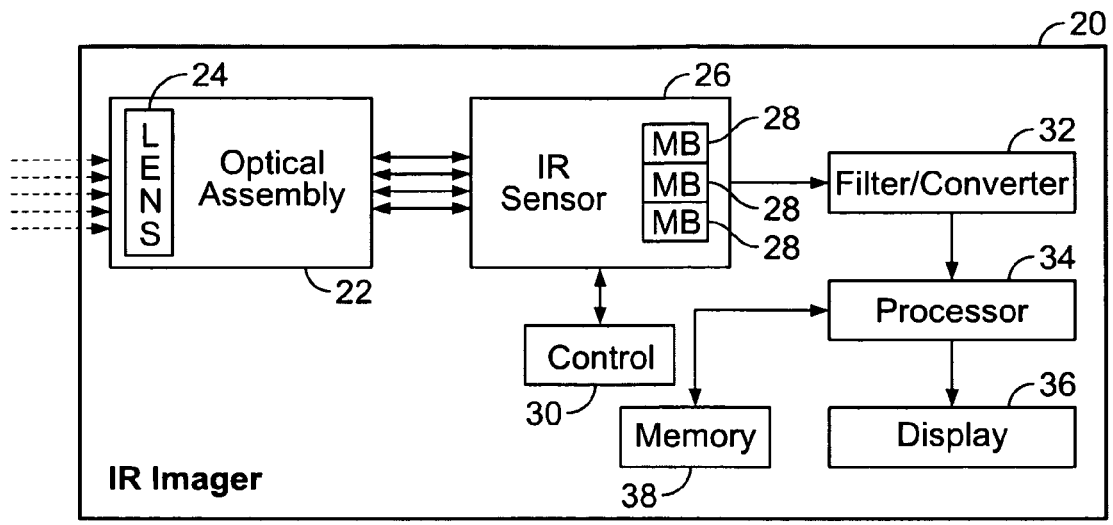
FIG. 1 is a block diagram of an infrared (IR) imager constructed in accordance with an embodiment of the invention.

In particular, various embodiments of the invention may be implemented in an IR imager 20 as shown in FIG. 1, which may be configured, for example, as an infrared camera. The IR imager 20 generally may include at a front end an optical assembly 22 that may include one or more lenses 24. The optical assembly 22 may be connected to an IR sensor 26 that may include one or more bolometer devices, and more particularly, one or more microbolometer (MB) units 28. The one or more microbolometer units 28 generally define an image core of the IR imager 20. The IR sensor 26 also may be connected to a control unit 30 and a filter/converter 32. Further the filter/converter 32 may be connected to a processor 34 that may be connected to a display 36. The processor 34 also may be connected to a memory 38.

The IR imager 20 in various embodiments is configured as an uncooled IR detector such that no external cooling device is provided. However, it should be noted that the IR imager 20 alternatively may be a cooled IR detector. More particularly, the IR imager 20 may include one or more microbolometer units 28 configured as uncooled thermal sensors. In operation, the IR imager 20 operates to measure incident electromagnetic radiation received and focused by the optical assembly 22 onto the IR sensor 26. Essentially, the one or more microbolometer units 28 each include one or more microbolometers that measure the radiation at one or more frequency ranges, which is detected as a resistance change. The detected resistance changes are measured and processed, which may include filtering the signal in any know manner and/or converting the signal from an analog input to a digital output using the filter/converter 32. The processor 34 then may generate a temperature map based on stored settings in the memory 38 and provide the output as a thermal image on the display 36.

It should be noted that different controls also may be provided to the IR imager 20. For example, biasing and/or reference signals may be provided to control and calibrate the IR imager 20, for example, to receive radiation at different frequency ranges.

Figure 2:
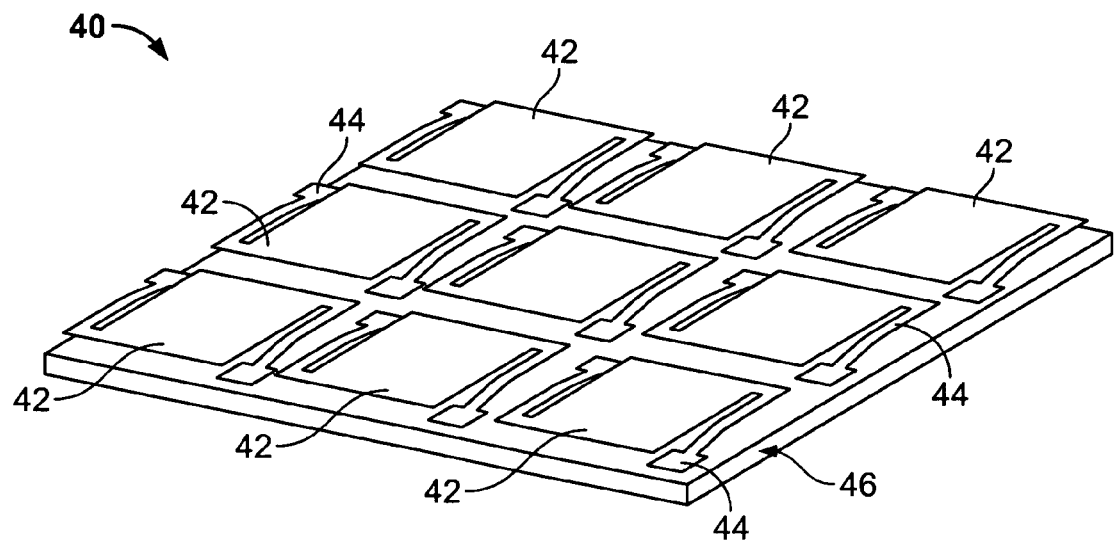
FIG. 2 is a top perspective view of an array of microbolometers constructed in accordance with an embodiment of the invention.

The one or more microbolometer units 28 may be configured as a grid 40 of individual microbolometers 42 as shown in FIG. 2 and define a sensor array. However, it should be noted that the size and dimension of the array may be modified as desired or needed. Further, each of the microbolometers 42 may include one or more electrodes 44 connecting each of the microbolometers 42 to a substrate 46.

Figure 3:
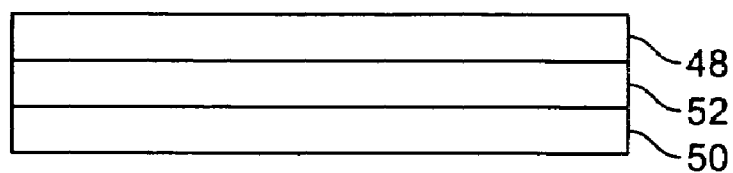
FIG. 3 is a side elevation view illustrating the layers of a microbolometer formed in accordance with an embodiment of the invention.

As shown in FIG. 3, each microbolometer 28 generally may be formed from an absorber layer 48 connected to a heat sink 50 (e.g., region of constant temperature) through an insulating layer 52 (e.g., an insulating link). A temperature measuring device (not shown) may be connected to the absorber layer 48. It should be noted that the absorber layer 48 and temperature measuring device may be provided as a single unit. It further should be noted that the insulation layer 52 in the various embodiments may be an air or vacuum region or gap. Also, it should be noted the thermal conduction may pass through the insulating layer 52 or along one or more edges of the microbolometer 28.

In operation, radiation absorbed by the absorber layer 48 raises the temperature above that of the heat sink layer 50 such that the higher the power absorbed, the higher the temperature. The temperature measuring device connected to the absorber layer 48 measures the temperature, from which the absorbed power can be calculated in any known manner. Thus, the grid 40 may be formed from a plurality of, for example, vanadium oxide or amorphous silicon heat sensors on top of a corresponding grid of silicon. Infrared radiation from a specific range of wavelengths may strike the top grid layer and changes the electrical resistance of that layer. The change in resistance is measured and processed into temperatures that may be represented graphically or used to form an image as described herein (e.g., in an IR camera). The grid 40 essentially includes a plurality of sensing elements defining a plurality of pixels of thermally sensitive film with an IR absorbing coating, which upon irradiation of infrared energy, causes the device temperature to rise, resulting in a change of electrical resistance. It should be noted that the change in electrical resistance may be sensed electrically and processed (e.g., translated) into a video signal. Further, each pixel essentially defines a thermistor, the resistance of which changes with temperature. For example, the pixels may be configured in different manners, for example, to detect about one-twentieth of one degree Celsius changes in temperature or generally less than one-tenth of one degree Celsius. However, each pixel may be configured to detect higher or lower temperature changes, such as changes of one or more degrees Celsius.

It should be noted the microbolometers 42 may be formed, for example, by a semiconductor deposition process. For example, an aluminum layer may be deposited on a substrate followed by the deposition of an amorphous silicon on the aluminum layer. Thereafter another aluminum layer may be deposited on the amorphous silicon. Detection areas (e.g., windows) then may be cut into the formed material using a photolithography process. The various steps used to form the microbolometers may be provided in any manner known in the art.

Figure 4:
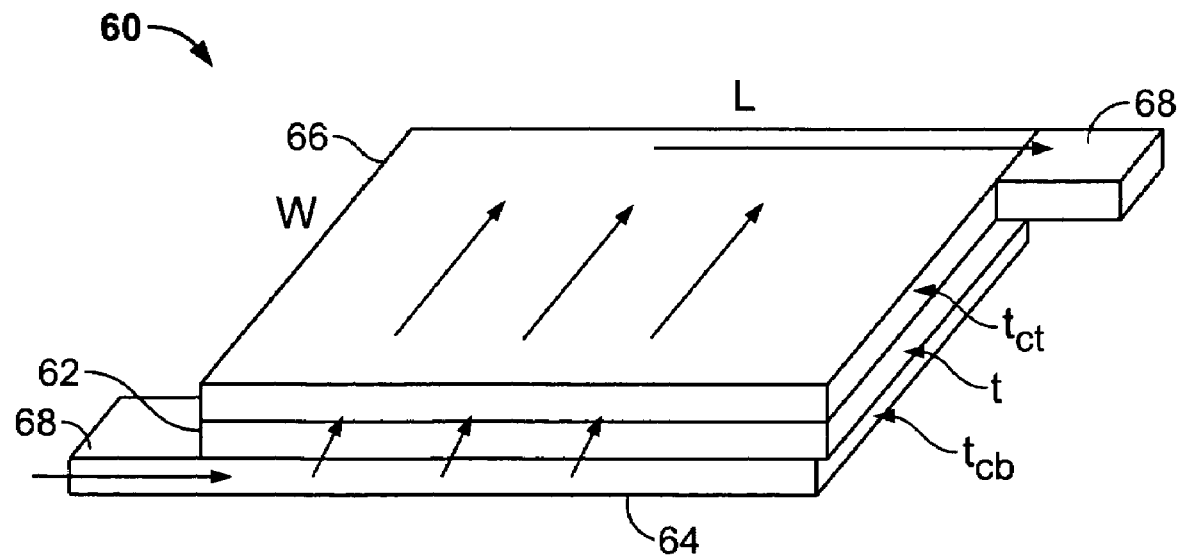
FIG. 4 is a top perspective view illustrating the structure of a microbolometer formed in accordance with an embodiment of the invention.

Various embodiments of the invention provide a microbolometer having a perpendicular conduction mode. More particularly, an IR sensitive core material 60 as shown in FIG. 4 may be formed from a bolometer layer 62 between a first conductor layer 64 and a second conductor layer 66. Specifically, the bolometer layer 62 may be formed from a sensing material (e.g., a resistive semiconductor material) and the first and second conductor layers 64 and 66 form electrode layers (e.g., aluminum conducting sheets) sandwiching the bolometer layer 62. The first and second conductor layers 64 and 66 also may include extending tabs 68 that extend beyond the edges of the layers that define leads on opposite corners. It should be noted that the arrows in FIG. 4 indicate the flow of electrons through the IR sensitive core material 60. It also should be noted that the structure shown in FIG. 4 may define a single pixel of the IR sensor 26 (shown in FIG. 1).

When the resistance across the first and second conductor layers 64 and 66 can be neglected as compared to the resistance through the bolometer layer 62, the resistance of the IR sensitive core material 60 may be defined as follows:

$$R = \rho * t/(L*W) \tag{1}$$

where $\rho$ represents the resistivity of the bolometer layer 62, t represents the thickness of the bolometer layer 62, L represents the length of the bolometer layer 62 and W represents the width of the bolometer layer 62. It should be noted that the bolometer layer 62 may be a thin film layer, for example, about 0.01 microns in thickness.

In operation, the sensing current flows from the tab 68 of the first conductor layer 64, into the first conductor layer 64, spreading in-plane, through the thickness (t) of the bolometer layer 62 and to the opposite conductor layer, namely the second conductor layer 66. The sensing current then flows in-plane through the second conductor layer 66 and is collected at the tab 68. It should be noted that the tabs 68 may generally define first and second leads of the first and second conducting layers 64 and 66.

With respect to the TCR of the bolometer layer 62, which may be formed, for example, from an amorphous silicon material, a wide resistivity range may be provided by varying the impurity doping levels. When forming the various layers of the IR sensitive core material 60, the first and second conductor layers 64 and 66 are formed as thin layers such that the first and second conduction layers 64 and 66 do not dominate thermal conduction in the plane of the sensitive core material 60. The thermal conduction also may be reduced by other aspects of the optimization performed during the thermal design (e.g. long, thermally isolating leads). However, the reduction of the thermal conduction, of the first and second conductor layers 64 is described herein an independent factor. Accordingly, the thickness of the first and second conductor layers 64 is determined as follows. It should be noted that because the electrode material may be, for example, a metal such as, but not limited to, platinum and aluminum, among others, with high electrical and thermal conductivity, the thickness of the first and second conductor layers 64 and 66 may be substantially thinner than the thickness of the bolometer layer 62. Thus, in embodiments where the in-plane thermal conductivity of the sensitive core material 60 is significant to the thermal design, the following equation defines the relationship between the first and second conductor layers 64 and 66, and the bolometer layer 62;

$$G_c * t_c < G_b * t_b \tag{2}$$

where $G_c$ and $G_b$ are the thermal conductivities of the materials for the first and second conductor layers 64 and 66, and the bolometer layer 62, respectively, and $t_c$ and $t_b$ are the thicknesses of the first and second conductor layers 64 and 66, and the bolometer layer 62, respectively.

As an example, for amorphous Si, $G_b$=5 W/m-K near room temperature with similar values for other amorphous semiconducting materials used to form bolometers. For $G_c$ the thermal conductivity of metal increases with the electrical conductivity of the metal and the values may range, for example, from 100 W/m-K to 400 W/m-K. For example, Al has a thermal conductivity of approximately 300 W/m-K near room temperature. Accordingly, the thickness of the first and second conductor layers 64 and 66 are provided such that minimal additional in-plane heat dissipation is provided by the first and second conductor layers 64 and 66.

Further, the first and second conductor layers 64 and 66 are provided such that the first and second conductor layers 64 and 66 contribute only a small portion of the overall resistance of a pixel element as described in more detail below. Specifically, the following equations are provided for configuring the various layers:

$$R_{total} = (\rho_b * t_b / (L*W)) + (2*(\rho_c * L / (W*t_c))) \quad (3)$$

and $$(\rho_b * t_b / (L*W)) > (2*(\rho_c * L / (W*t_c))) \quad (4)$$

where (1) $\rho_b$ and $\rho_c$ are the electrical resistivity of the bolometer layer 62, and the first and second conductor layers 64 and 66, respectively, (2) $t_b$ and $t_c$ are the thickness of the bolometer layer 62, and the first and second conductor layers 64 and 66, respectively, and (3) W and L are the width and length of the layers.

Equations 2 and 4 may be combined to derive the following equation:

$$t_b^2 > 2 \frac{\rho_c C_c L^2}{\rho_b G_b} \text{ or } t_b > L \sqrt{\frac{2\rho_c G_c}{\rho_b G_b}} \quad (5)$$

Accordingly, Equation 5 may be used to determine the thickness for the bolometer layer 62. For example, amorphous silicon and aluminum have resistivities of approximately $10^3$ ohm-cm and $3 \times 10^{-6}$ ohm-cm, respectively. Using Equation 5, results in $t_b > L*6*10^{-4}$, or a minimum thickness of the bolometer layer of 18 nanometers (nm) for a 30 micrometer (μm) by 30 μm sensing area. Thus, the thickness of the bolometer layer 62 may be, for example, at or above 50 nm (e.g., factoring in design tolerances). In various IR imager applications the thickness of the bolometer layer 62 may be, for example, between 10 nm-1000 nm with the thicknesses of the first and second conductor layers 64 being 10 nm each. However, the thickness of the bolometer layer 62 may be greater or smaller as desired or needed.

Thus, various embodiments of the invention provide a microbolometer having a perpendicular conduction mode, thereby improving TCR and resulting in improved sensitivity. Accordingly, bolometer materials with higher resistivity may be used to provide a desired or required device total resistance. It should be noted that when using bolometer materials with a negative TCR (e.g., amorphous Si, VOx, and other semiconducting materials) higher TCR values may be obtained with a higher resistivity. Accordingly, a higher TCR coefficient is provided with higher resistivity material.

It should be noted that the various embodiments, including, for example, the various layers described herein may be formed from any suitable material, and based on, for example, the particular application. Further, the size and shape of the various layers also may be modified as desired or needed. Additionally, the various embodiments may be used in connection with a system or device wherein a bolometer or microbolometer is needed or desired.

While the invention has been described in terms of various specific embodiments, those skilled in the art will recognize that the various embodiments of the invention can be practiced with modification within the spirit and scope of the claims.

What is claimed is:

1. A microbolometer comprising:
a first conductor layer;
a second conductor layer; and
a bolometer layer between the first conductor layer and the second conductor layer, wherein a minimum thickness of the bolometer layer is a function of at least one of a length of the bolometer layer, a resistivity of at least one of the first and second conductor layers, and a thermal conductivity of at least one of the first and second conductor layers; wherein the first and second conductor layers, and the bolometer layer, are defined using the following equation:

$$G_c * t_c < G_b * t_b$$

where $G_c$ and $G_b$ are the thermal conductivities of the materials for the first and second conductor layers, and the bolometer layer, respectively; and $t_c$ and $t_b$ are thicknesses of the first and second conductor layers, and the bolometer layer, respectively.

2. A microbolometer in accordance with claim 1 wherein the first conductor layer and the second conductor layer each comprise a lead extending beyond an edge of each of the first and second conductor layers.

3. A microbolometer in accordance with claim 1 wherein the first and second conductor layer are configured to provide a substantially perpendicular electrical conduction mode.

4. A microbolometer in accordance with claim 1 wherein the minimum thickness is inversely proportional to the root of at least one of the resistivity and the thermal conductivity of the bolometer layer.

5. A microbolometer in accordance with claim 1 wherein the length and a width of the microbolometer layer are substantially the same as a length and width of the first and second conductor layers.

6. A microbolometer in accordance with claim 1 wherein the thickness of the bolometer layer is at least fifty nanometers (nm).

7. A microbolometer in accordance with claim 1 wherein the first and second conductor layers each comprises a metal.

8. A microbolometer in accordance with claim 1 wherein the bolometer layer comprises a semiconducting material.

9. A microbolometer in accordance with claim 1 wherein a thickness of the first and second conductor layers is substantially less than a thickness of the bolometer layer.

10. A microbolometer in accordance with claim 1 wherein electron flow is substantially vertical through the bolometer layer and substantially in plane in each of the first conductor layer and the second conductor layer.

11. A microbolometer in accordance with claim 1 further comprising contacts at opposite corners of the first and second conductor layers.

12. A microbolometer in accordance with claim 1 wherein the bolometer layer is configured to sense infrared radiation.

13. A thermal camera comprising a microbolometer formed in accordance with claim 1.

14. A thermal camera in accordance with claim 13 wherein the microbolometer is configured to sense infrared (IR) radiation.

15. A thermal camera in accordance with claim 13 wherein the microbolometer is an uncooled device.

16. A microbolometer in accordance with claim 1 wherein the bolometer layer includes an electrical input that is coupled to the first conductor layer and an electrical output that is coupled to the second conductor layer.

17. A microbolometer in accordance with claim 16 wherein electron flow is substantially vertical through the bolometer layer from the electrical input to the bolometer electric output.

18. A microbolometer comprising:
a first conductor layer;
a second conductor layer; and
a bolometer layer between the first conductor layer and the second conductor layer, wherein the minimum thickness of the bolometer layer is defined using at least one of the following equations:

$$t_b^2 > 2\frac{\rho_c C_c L^2}{\rho_b G_b} \text{ or } t_b > L\sqrt{\frac{2\rho_c G_c}{\rho_b G_b}} \quad (5)$$

where ρb and ρb are the resistivities of the bolometer layer and the first and second layers, respectively; Gc and Gb are the thermal conductivities of the materials for the first and second conductor layers and the bolometer layer, respectively; and L is the length of the bolometer layer.

19. A method for detecting electromagnetic radiation, the method comprising:
receiving at a thermally sensitive film electromagnetic radiation; and
sensing a resistance change in a bolometer material disposed between conductor layers based on the received electromagnetic radiation using a substantially perpendicular electrical conduction mode, the bolometer material having a minimum thickness that is a function of at least one of a length of the bolometer material, a resistivity of at least one of the conductor layers, and a thermal conductivity of at least one of the conductor layers;
wherein the first and second conductor layers, and the bolometer layer, are defined using the following equation:

$$G_c * t_c < G_b * t_b$$

where $G_c$ and $G_b$ are the thermal conductivities of the materials for the first and second conductor layers, and the bolometer layer, respectively; and $t_c$ and $t_b$ are thicknesses of the first and second conductor layers, and the bolometer layer, respectively.

20. A method in accordance with claim 19 wherein the minimum thickness is inversely proportional to the root of at least one of the resistivity and the thermal conductivity of the bolometer layer.

21. A method in accordance with claim 19 further comprising forming a thermal image based on the received electromagnetic radiation.

22. A method in accordance with claim 19,
wherein the minimum thickness of the bolometer layer is defined using at least one of the following equations:

$$t_b^2 > 2\frac{\rho_c C_c L^2}{\rho_b G_b} \text{ or } t_b > L\sqrt{\frac{2\rho_c G_c}{\rho_b G_b}} \quad (5)$$

where $\rho_b$ and $\rho_b$ are the resistivities of the bolometer layer and the first and second layers, respectively; $G_c$ and $G_b$ are the thermal conductivities of the materials for the first and second conductor layers and the bolometer layer, respectively; and L is the length of the bolometer layer.

23. A method for detecting electromagnetic radiation, the method comprising:
receiving at a thermally sensitive film electromagnetic radiation; and
sensing a resistance change in a bolometer material disposed between conductor layers based on the received electromagnetic radiation using a substantially perpendicular electrical conduction mode, the bolometer material having a minimum thickness that is defined using at least one of the following equations:

$$t_b^2 > 2\frac{\rho_c C_c L^2}{\rho_b G_b} \text{ or } t_b > L\sqrt{\frac{2\rho_c G_c}{\rho_b G_b}} \quad (5)$$

where $\rho_b$ and $\rho_b$ are the resistivities of the bolometer layer and the first and second layers, respectively; $G_c$ and $G_b$ are the thermal conductivities of the materials for the first and second conductor layers and the bolometer layer, respectively; and L is the length of the bolometer layer.

* * * * *